(No Model.)

D. SNYDER.
POT AND KETTLE.

No. 279,671. Patented June 19, 1883.

Witnesses:
L. J. White
H. E. Remick

Inventor:
David Snyder,
Per C. C. Shaw,
Atty.

UNITED STATES PATENT OFFICE.

DAVID SNYDER, OF GRAFTON, MASSACHUSETTS, ASSIGNOR TO HIMSELF AND ALBERT LABAN FISHER, OF SAME PLACE.

POT AND KETTLE.

SPECIFICATION forming part of Letters Patent No. 279,671, dated June 19, 1883.

Application filed April 16, 1883. (No model.)

*To all whom it may concern:*

Be it known that I, DAVID SNYDER, of Grafton, in the county of Worcester, State of Massachusetts, have invented a certain new and useful Improvement in Pots and Kettles, of which the following is a description sufficiently full, clear, and exact to enable any person skilled in the art or science to which said invention appertains to make and use the same, reference being had to the accompanying drawings, forming a part of this specification, in which—

Figure 1:
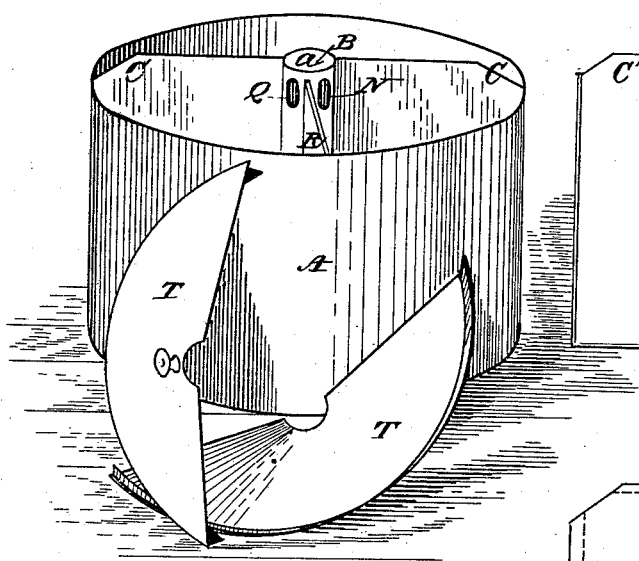
Figure 2:
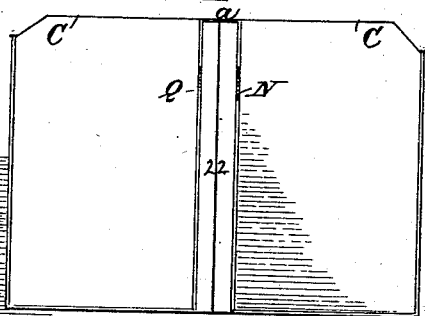
Figure 3:
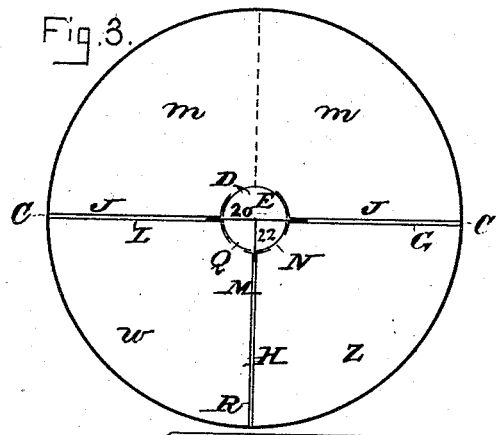

Figure 1 is an isometrical perspective view, showing my improved kettle with the covers removed; Fig. 2, a vertical transverse section; Fig. 3, a cross-section; and Figs. 4, 5, and 6, plan views of the blanks from which the ventilating-tube, partition-walls, and supplemental bottom are formed.

Like letters of reference indicate corresponding parts in the different figures of the drawings.

My invention is designed as an improvement on the pot or kettle secured to me by Letters Patent of the United States, dated March 20, A. D. 1883, No. 274,417; and it consists in a novel construction and arrangement of the parts, as hereinafter more fully set forth and claimed, by which a more effective and desirable article of this character is produced than is now in ordinary use. The kettle described in said patent is composed of cast metal, and has its covers detachably hinged to the top of the main partition-wall, which rises above the body of the kettle, and prevents the steam or fumes from one compartment intermingling with those in the other. The last-named feature is a valuable one; but being composed of cast metal and provided with partitions, the kettle has been found to be too heavy, and, having no flue or ventilator for carrying off the steam, is objectionable on that account. To obviate these objections I make use of means which will be readily understood by all conversant with such matters from the following explanation.

In the drawings, A represents the body of the kettle, which is preferably composed of tin or other suitable sheet metal, and provided with a copper bottom tinned on its inner side in the ordinary manner. The kettle may be divided into two or more compartments, as desired, that represented in Fig. 1 having three.

A ventilating-flue, B, for carrying off the steam and fumes which arise from the cooking, is disposed at the center of the kettle, and opens downwardly through its bottom, the top of the flue being closed by the cap *a*.

Figure 4:
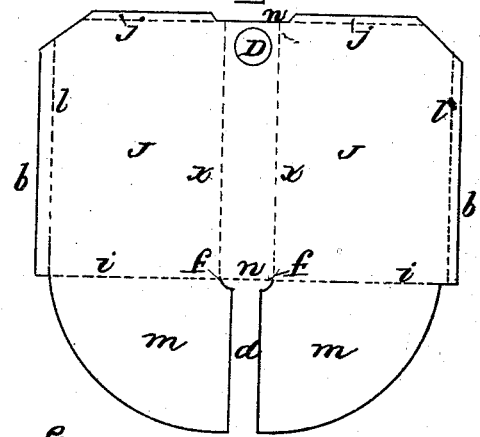

The partition-walls, which are double and integral with the flue, are constructed as follows: A blank is first cut from a sheet of tin, as shown in Fig. 4, for forming one side of the main wall C. This blank has a hole, D, punched in its center near the upper edge, and one of its ends rounded, as seen at *m m*. A slot is formed in the rounded end, as shown at *d*, the inner end of the slot being widened, as seen at *f*. The blank is then raised or curved from *n* to *n* between the dotted lines *x x*, the raised portion forming one-half of the flue B when the wall is adjusted in position in the body of the kettle. The blank is also bent on the dotted line *i i* until the parts *m m* stand at a right angle to the body of the blank. The edges *b b* are also turned down on the dotted lines *l l* to a right angle with the body of the blank, and the blank then inserted in the body of the kettle, and secured by soldering the parts *b* to the sides and the parts *m* to the bottom of the same.

It will be understood that when that part of the blank between the lines *x x* is raised or curved, as described, to form one-half of the flue B, the edges of the slot *d* will be brought into contact, and that they are also soldered together after the blank is inserted in position, the parts *m m* forming one-half of the supplemental or false bottom of the kettle.

Figure 5:
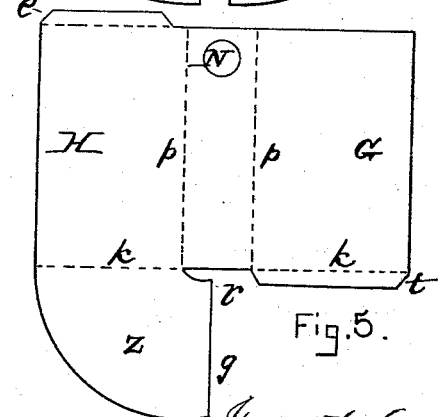
Figure 6:
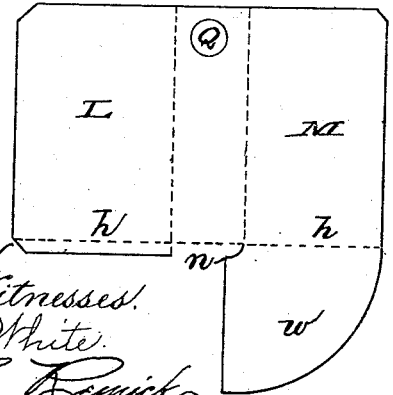

It will also be understood that the curved portion of the blank between the lines *x x* projects over the inner corners of the parts *m* when said parts are turned at a right angle to the body of the blank, and that by cutting off the inner corners, as shown at *f f*, an opening will be made from the flue into the central opening, E, immediately under the flue, through the bottom of the kettle. After one-half of the main partition-wall C and flue B has been formed as described, the blank shown in Fig. 5 is used, this blank being raised or curved between the dotted lines p p to form one-quarter of the flue B, and having its rounded portion z turned at right angles to the body of the blank, which is then bent so that the parts G H stand at right angles to each other and inserted in the body of the kettle, the flange t being under the edge g of the part z and these parts securely soldered to the body of the kettle. After the blank shown in Fig. 5 has been properly formed and inserted in the kettle, as described, the blank shown in Fig. 6 is used. This blank is the reverse of that shown in Fig. 5, and is bent or formed in substantially the same manner, its rounded end w and a flange, v, being turned at right angles to its body on the dotted line h. The inner corner, n, is then cut off, and the two sections L M of the body bent or doubled at right angles to each other and inserted in the kettle and properly secured by soldering. A flange, e, on the upper part of section H is turned down over the top of section M, and two flanges, j j, on the upper part of the blank J are turned down over the tops of the sections L G.

The blank shown in Fig. 5 is provided with a hole, N, and the blank shown in Fig. 6 with a hole, Q, these holes opening from the respective compartments of the kettle into the flue B, near its top, under the cap a. The flue is partitioned to correspond with the partition-walls of the kettle, the partitions in the flue consisting of a strip of sheet metal, 20, arranged on a line with the main partition-wall C, and a narrower strip, 22, arranged on a line with the supplemental wall R, these strips preventing the steam or fumes in one compartment from passing into another through the inlet-holes in the flue. One of the edges of the strip 20 is inserted between the sections J L and the other between the sections J G of the wall C. One of the edges of the strip 22 is inserted between the sections M H, and the other rests against the strip 20.

From the foregoing it will be seen that the partition-walls C R and bottom of the kettle are double, and that one-half of the flue B is formed from the blank shown in Fig. 4, one-quarter from that shown in Fig. 5, and one-quarter from that shown in Fig. 6. The partition C is extended above the top of the kettle, and the flue B elongated accordingly, the holes D Q N being arranged near the top of the flue.

By arranging the flue at the center of the kettle it can be supported more securely by the partitions, and is thereby rendered capable of ventilating various compartments of the kettle to better advantage than would be possible if placed in any other position.

I do not confine myself strictly to forming the flue integral with the partition-walls of the kettle, as it may be made separately and secured in position by soldering to the walls, or in any other suitable manner. Neither do I confine myself to making the partition-walls or the bottom of the kettle double, as these may be made single and the wall R omitted, if desired.

The covers T are straight on one side and fit against the partition C, which rises above the covers and is closely connected with the flue B on either side, thereby steadying the flue and preventing the steam and fumes in the larger compartment from entering the smaller compartments over the top of the wall, and vice versa. The covers are also slightly conical, or so formed as to reach above the holes in the flue and still permit the holes to be arranged above the level of the top of the kettle, thereby enabling the kettle to be more nearly filled than would be possible if the flue stood in any other position. The sections which compose the partition-walls being extended, as shown at m z w, to form a double bottom to the kettle, it is rendered much stronger and more durable than when provided with single walls and a single bottom.

Having thus explained my improvement, what I claim is—

1. A pot or kettle provided with a cover or covers and having a flue-opening through its bottom for carrying off the steam or fumes, said flue being provided with inlet-holes arranged above the top of the kettle, in combination with a partition-wall for dividing the kettle into compartments, said wall being closely connected to the flue and rising above the top of the kettle, substantially as and for the purpose specified.

2. A pot or kettle having a double partition-wall, a double bottom, and a flue-opening through its bottom, the sections forming the walls being integral with corresponding sections of the inner or supplemental bottom, substantially as shown and described.

3. In a pot or kettle, a blank consisting of the sections J J, provided with the curved ends m m, slot d, nicks f f, and hole D, a blank consisting of the sections L M, provided with the curved end w, nick n, and hole Q, and a blank consisting of the sections G H, provided with the curved end z, nick r, and hole N, said blanks being bent or shaped and arranged to form the partition-walls, flue, and supplemental bottom of the kettle, substantially as shown and described.

DAVID SNYDER.

Witnesses:
ISAAC D. GOULDING,
HUBERT PARKER.